United States Patent
Piccirilli et al.

(10) Patent No.: US 7,386,613 B2
(45) Date of Patent: Jun. 10, 2008

(54) SYSTEM AND METHOD FOR MEASURING MIDDLEWARE RESPONSE TIME

(75) Inventors: Anthony Piccirilli, New Castle, PA (US); Kevin Loesch, Wexford, PA (US); Thomas Ryan, Pittsburgh, PA (US)

(73) Assignee: Computer Associates Think, Inc., Islandia, NY (US)

( * ) Notice: Subject to any disclaimer, the term of this patent is extended or adjusted under 35 U.S.C. 154(b) by 700 days.

(21) Appl. No.: 10/750,009

(22) Filed: Dec. 30, 2003

(65) Prior Publication Data

US 2005/0055439 A1 Mar. 10, 2005

Related U.S. Application Data

(60) Provisional application No. 60/437,848, filed on Jan. 3, 2003.

(51) Int. Cl.
*G06F 13/00* (2006.01)
(52) U.S. Cl. .................. 709/224; 709/238; 709/249

(58) Field of Classification Search ................ 709/217, 709/224, 232, 238, 249
See application file for complete search history.

(56) References Cited

U.S. PATENT DOCUMENTS

| | | | |
|---|---|---|---|
| 6,711,137 B1 | 3/2004 | Klassen et al. | |
| 6,768,968 B2* | 7/2004 | Ignatowski et al. | 702/186 |
| 6,885,641 B1* | 4/2005 | Chan et al. | 370/252 |
| 2002/0099821 A1 | 7/2002 | Hellerstein et al. | |
| 2002/0116501 A1 | 8/2002 | Ho et al. | |
| 2006/0067213 A1* | 3/2006 | Evans et al. | 370/229 |

* cited by examiner

*Primary Examiner*—Viet D. Vu
(74) *Attorney, Agent, or Firm*—Baker Botts L.L.P.

(57) ABSTRACT

System and method for monitoring middleware performance is described herein. A route time for a sample message transmitted along a predetermined network route is determined and at least one queue residency time is determined. The at least one queue residency time reflects an amount of time an actual application message is stored in at least one respective local production queue located along the network route. Middleware response time is calculated according to the route time and the at least one queue residency time.

23 Claims, 6 Drawing Sheets

MQSeries Agent - Local Queues

File  View  Help

| h % (Warn, Crit) > | <Avg Residency (Warn, Crit) > | <Max Residency (Warn, Crit) > |
|---|---|---|
| 0 (0,0) | 0 (0,0) | 0 (0,0) |
| 0 (0,0) | 0 (0,0) | 0 (0,0) |
| 2 (0,0) | 13786 (500,1000) | |
| 2 (0,0) | 13705 (500,1000) | 28063 (2000,3000) |
| 0 (0,0) | 0 (0,0) | |
| 0 (0,0) | 0 (0,0) | |
| 0 (0,0) | 0 (0,0) | |
| 0 (0,0) | 0 (0,0) | |
| 4 (0,0) | 3628 (1500,2500) | |
| 0 (0,0) | 0 (0,0) | |
| 0 (0,0) | 0 (0,0) | |

Agent Name: MQAgent_RMDEV4        Version: 3...

*FIG. 9b*

Add Queue Threshold

QMGR:        RMDEV4
QUEUE NAME:  ...RESIDENCY QUEUE
WARNING:     1500
CRITICAL:    2500
THRESHOLD:   (MQQRESTM) Average Queue Residency Note: * and % can be used to mask the QMGR and Queue names
on all thresholds except (MQQRES) Queue Residency

OK          CANCEL

*FIG. 9a*

SYSTEM AND METHOD FOR MEASURING MIDDLEWARE RESPONSE TIME

CROSS-REFERENCE TO RELATED APPLICATIONS

This application claims the benefit of U.S. Provisional Application No. 60/437,848, filed Jan. 3, 2003, the entire disclosure of which is incorporated herein by reference.

FIELD

The present application relates to message oriented middleware performance monitoring and, more particularly, to a system and a method for measuring middleware response time.

BACKGROUND INFORMATION

Generally, middleware is software that has its own application programming interfaces ("APIs") that help insulate software developers from operating system-specific APIs. A middleware layer is often located between client and server processes. By measuring the route time associated with the middleware layer of an application, problems can be identified and corrected resulting in improved performance and availability. Currently, the route time associated with a middleware application can be measured by changing the code of the application itself. Such a procedure is considered intrusive. Other known procedures used for measuring route time rely on a host of resources and require synchronization among multiple components.

Thus, there is a need for a non-intrusive system and method that monitors the performance of middleware by measuring the route time and storage residency time, for example, the residency time of a message stored in at least one queue. As a result, a determination can made as to which component(s) of a configuration is problematic or potentially problematic. A need also exist for monitoring the middleware performance without requiring synchronization.

SUMMARY OF THE INVENTION

An aspect of the present application provides for a method for monitoring middleware performance. The method may include determining a route time for a message transmitted along a predetermined network route, determining at least one queue residency time, the at least one queue residency time reflecting an amount of time at least one other message is stored in at least one respective queue located along the predetermined network route, and calculating a middleware response time according to the route time and the at least one queue residency time.

Another aspect of the present application provides for a method for monitoring middleware performance. The method may include determining a route time for a user—defined sample message to be transmitted along a predetermined network route, the route time reflecting an amount of time for the sample message to travel from an origination queue manager to a destination queue manager and then back along the same route to the origination queue manager, determining at least one queue residency time for at least one local production queue, the at least one local production queue being associated with the origination queue manager and/or the destination queue manager and the at least one queue residency time reflecting the amount of time an actual application message is stored in the at least one local production queue, and calculating a middleware response time by adding the route time to the at least one queue residency time.

A further aspect of the present application provides for a system for monitoring middleware performance. The system may include a computer system adapted to generate a sample message and an application message, and a computer memory electrically connected to the computer system encoded with instructions for performing the following: determining a route time for the sample message transmitted along a predetermined network route; determining at least one queue residency time, the at least one queue residency time reflecting an amount of time the application message is stored in at least one respective queue located along the predetermined network route; and calculating a middleware response time according to the route time and the at least one queue residency time.

DETAILED DESCRIPTION

In the exemplary embodiments of the present application, application middleware response time for a message oriented middleware ("MOM") based application can be estimated without changes to the respective application(s) and is, therefore, non-intrusive, as described herein. An example of such a MOM based application is the e-business infrastructure software sold by IBM® under the label WebSphere® MQ. WebSphere® MQ is a middleware solution for interconnecting business applications in heterogeneous environments. Middleware response time is described in the present application as being comprised of two components: route time and the sum of each of the storage residency times. Even though storage residency time is referred to in the present application as queue residency time, the exemplary embodiments are equally applicable to additional storage mediums besides queues. Additionally, application processing time is not considered in determining the middleware response time as described in detail herein. Alternatively, however, processing time can be included in the response time determination.

Figure 1:
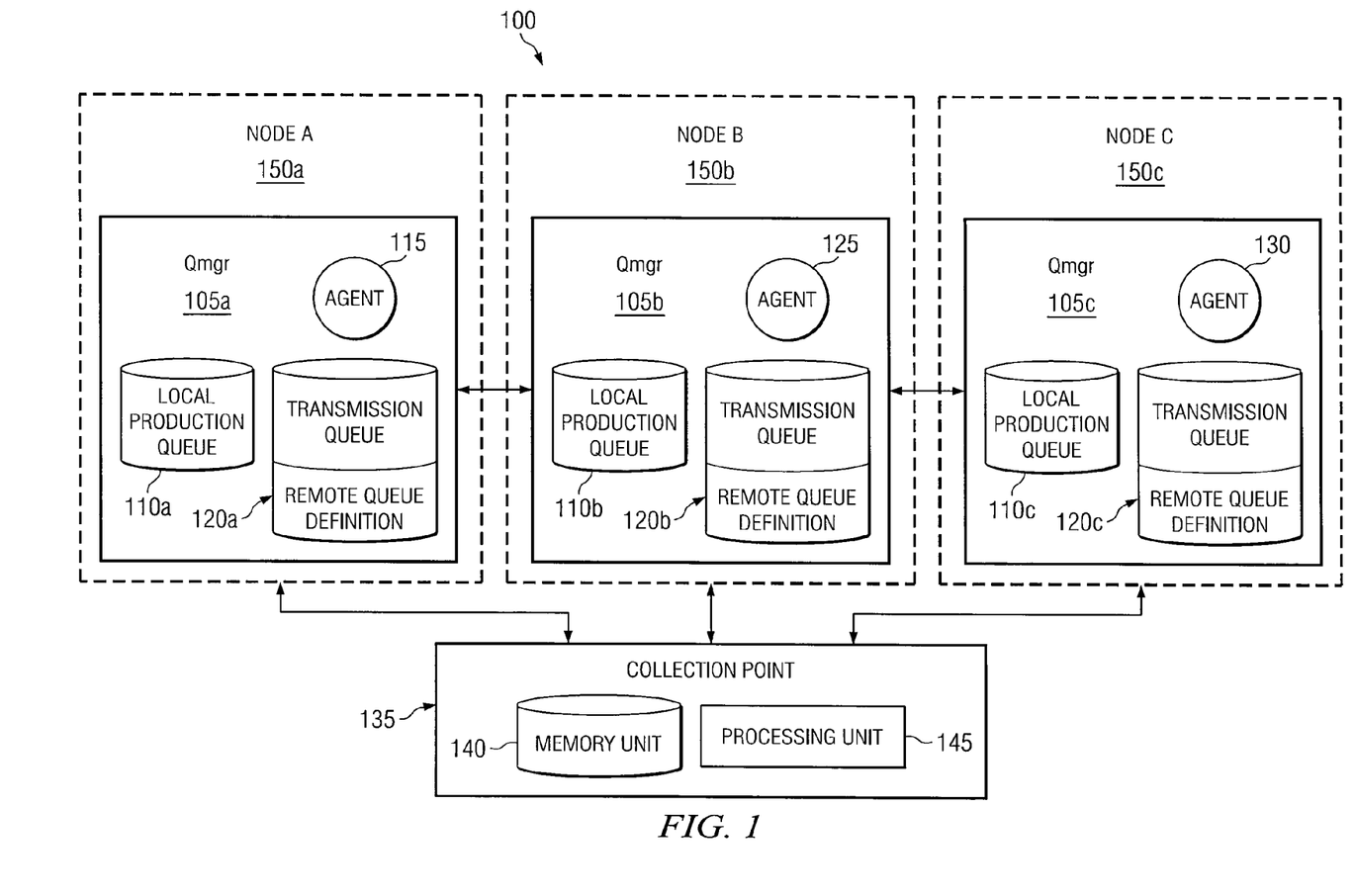
FIG. 1 illustrates an exemplary block diagram of the present disclosure for monitoring middleware performance.

FIG. 1 illustrates an exemplary MOM network 100. MOM network 100 includes three exemplary queue managers ("Qmgr") or MOM controllers, referred to herein as queue managers: queue manager 105a, queue manager 105b and queue manager 105c. Queue managers 105a, 105b, 105c are associated with node A 150a, node B 150b, node C 150c and local production queues 110a, 110b, 110c, respectively. Furthermore, queue managers 105a, 105b, 105c are associated with agents 115, 125, 130 and transmission queues 120a, 120b, 120c, respectively. The number of queue managers in MOM network 100 and the number and type of queues associated with the respective queue managers are merely illustrative. Data can be transmitted from node A 150a, node B 150b and node C 150c to collection point 130. Collection point 130 includes memory unit 140 and processing unit 145.

Each transmission queue is associated with a corresponding remote queue definition, as can be seen in FIG. 1. Remote queue definitions are not real queues, but name aliases that are controlled as though they were real queues. An effect of the remote queue definition is to define a physical destination queue name and queue manager name. The use of remote queue definitions is well known to a person having ordinary skill in the art and is therefore not described in detail herein.

As will be described below, a sample message is transmitted from and to queue manager 105a along the same path or network route in MOM network 100 as would be used by an application to be monitored and the sample message is temporarily stored in each transmission queue 120a, 120b, 120c along the network route. The sample message is used to determine the route time.

Additionally, an actual application message is stored at each local production queue 110a, 110b, 110c to determine the respective queue residency times.

Figure 2:
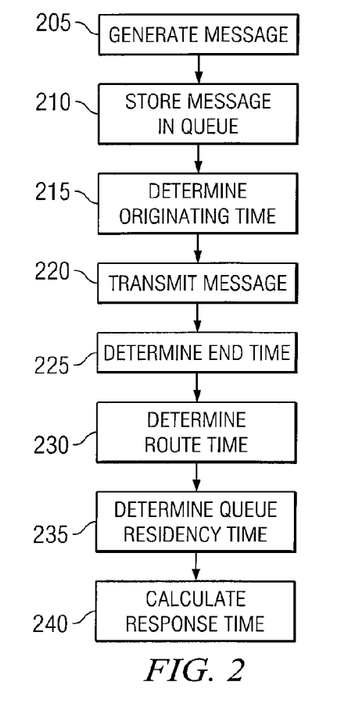
FIG. 2 illustrates an exemplary flow diagram of an embodiment for determining route time, queue residency time and response time.

FIG. 2 illustrates an exemplary flow diagram for estimating an application middleware response time of a MOM application. In order to measure the estimated response time for the MOM application, the route time and at least one queue residency time need to be determined. The exemplary equation for determining the application middleware response time ("AMRT") is as follows:

$$AMRT = \text{Route Time} + \Sigma(\text{Queue Residency Times}).$$

In order to determine the route time component of the equation, a sample message is generated, in 205. In an exemplary embodiment, the sample message includes a plurality of messages batched together. The size of each of the plurality of messages can be the same or have varying sizes. Alternatively, the sample message is a single message. Preferably, the sample message replicates an actual message that would be transmitted within MOM network 100. The number of messages batched in a sample message and the size of each of the messages is user-controlled, for instance, by interacting with at least one user interface.

Figure 5:
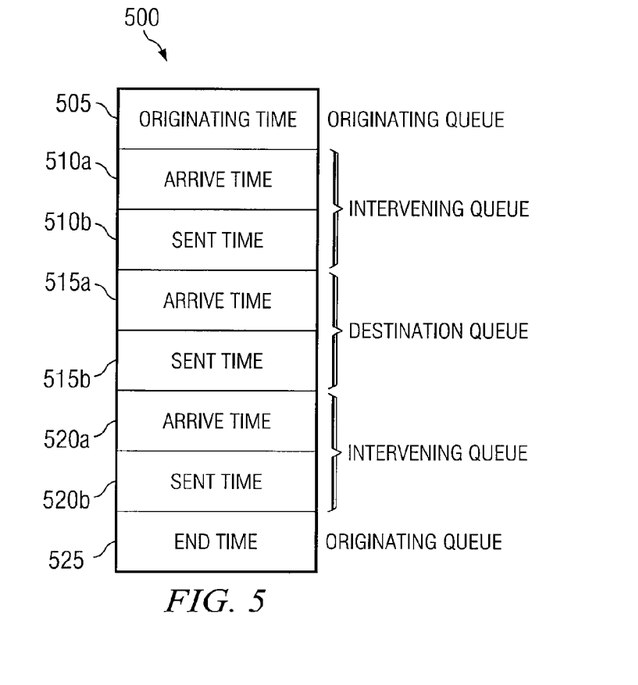
FIG. 5 illustrates an exemplary data structure.

The sample message is stored, in 210. Agent 115 associated with queue manager 105a puts the sample message in transmission queue 120a. Transmission queue 120a temporarily stores the sample message to be sent to another part of the application residing on queue manager 105b. Remote queue definition associated with transmission queue 120a points to or identifies queue manager 105b and, more particularly, transmission queue 120b and its associated remote queue definition. Before the message is transmitted, the originating time is determined by agent 115, in 215. The originating time is stored in field 505 of sample message 500, as shown in FIG. 5, and the sample message is transmitted within MOM network 100, in 220.

Figure 4:
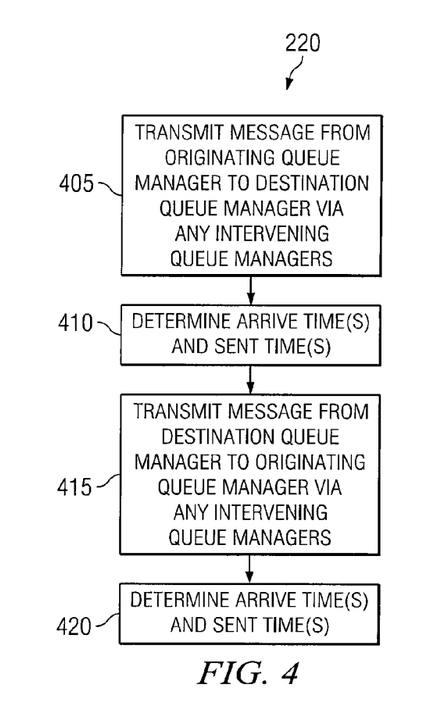
FIG. 4 illustrates an exemplary flow diagram of an embodiment for determining route time.

FIG. 4 sets forth in more detail the transmission of the sample message and the determination of at least one arrive time and at least sent time along the route. In 405, the sample message is transmitted from originating queue manager 105a to destination queue manager 105c via intervening queue manager 105b. Specifically, the sample message is first transmitted to and temporarily stored in transmission queue 120b since remote queue definition associated with transmission queue 120a points to transmission queue 120b. At node B 150b, channel or message exits associated with agent 125 determine timestamps for when the sample message enters transmission queue 120b and exits transmission queue 120b, referred to as the arrive time and the sent time, respectively, in 410. The arrive time and the sent time are added to the sample message in field 510a and field 510b, respectively, as shown in FIG. 5.

Next, the application component on queue manager 105b associated with agent 125 retrieves the sample message temporarily stored in transmission queue 120b and according to the respective remote queue definition transmits the sample message to another application component on destination queue manager 105c. At destination queue manager 105c, the sample message is temporarily stored in transmission queue 120c. Similarly, at node C 150c, channel or message exits associated with agent 130 determine timestamps for when the sample message enters transmission queue 120c and exits transmission queue 120c, referred to as the arrive time and the sent time, respectively, in 410. The arrive time and the sent time are added to the sample message in field 515a and field 515b, respectively, as shown in FIG. 5.

Figure 3:
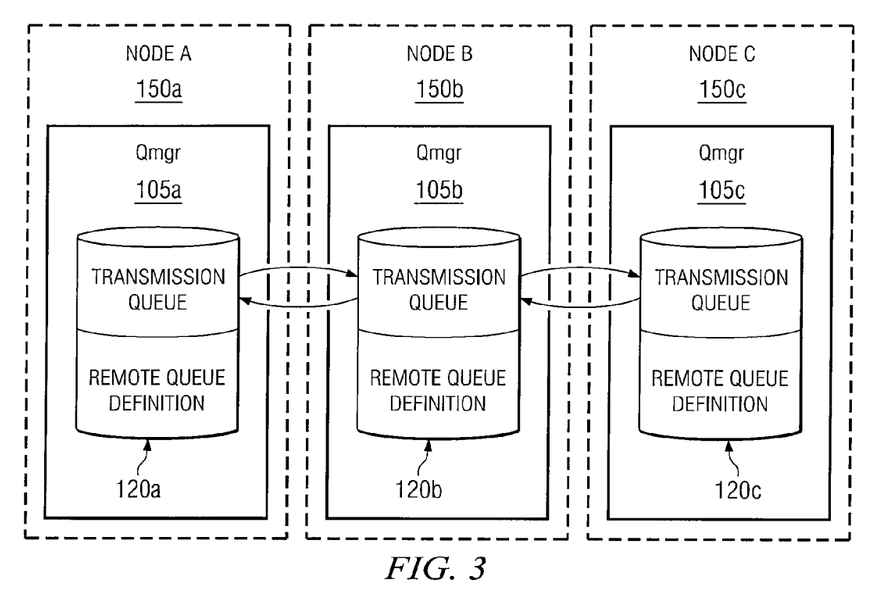
FIG. 3 illustrates an exemplary block diagram of the present disclosure for determining route time.

The application component on queue manager 105c associated with agent 130 retrieves the message temporarily stored in transmission queue 120c and according to the respective remote queue definition transmits the sample message back to originating queue manager 105a via intervening queue manager 105b, in 415. In an exemplary embodiment, the sample message is transmitted back to originating queue manager 105a along the same route that the sample message traveled to get to destination queue manager 105c, a purpose of which is described below. The exemplary route of the sample message is shown in FIG. 3. Alternative routes for sample messages are also described below. In 420, like in 410, an arrive time and a sent time for the sample message are determined for intervening queue manager 105b. The arrive time and sent time are stored in field 520a and field 520b of the sample message, as shown in FIG. 5. Once the sample message arrives back to originating queue manager 105a, agent 115 determines an end time, in 225, and the end time is stored in field 525 of the sample message. In an exemplary embodiment, agent 115 determines that the sample message transmitted from queue manager 105a is the same as the received message by comparing an identification stored in a field of each received message.

Data indicating the various timestamps shown in FIG. 5 are transmitted to collection point 135. Processing unit 145 at collection point 135 determines the route time, in 230. Route time is defined as the time it takes a sample message to be transmitted from the queue manager where the message originated, for instance, queue managers 105a, across any intermediate queue manager(s), to a destination queue manager, for instance, queue manager 105c, and have the message transmitted back to the originating queue manager from the destination queue manager 105c along the same route. In an exemplary embodiment, measurement of route time relies on an independent process that sends sample messages through MOM network 100 using the same paths as the application to be measured. As described above, the route time component is measured by creating a series of daisy-chained remote queue definitions across all queue managers involved in the measurement, for example, queue managers 105a, 105b, 105c.

Based on the originating timestamp stored in field 505 and the end timestamp stored in field 525, processing unit 145 determines the route time, in 230. Specifically, the route time is determined by taking the difference of the originating timestamp and the end timestamp. Since the originating timestamp and the end timestamp are associated with the same queue manager 105a, synchronization is not an issue. The route time is stored in memory unit 140 at collection point 135.

Furthermore, based on the arrive timestamps and the sent timestamps for intervening queue manager 105b and destination queue manager 105c stored in fields 510a . . . 520b, intra-queue manager times are determined by processing unit 145. In particular, the difference between the arrive timestamp and the corresponding sent timestamp for a respective queue manager represents the intra-queue manager time. The sum of the intra-queue manager times along MOM network 100 represents the total queue manager processing time. In an exemplary embodiment, averages of the intra-queue manager times along MOM network 100 can also be calculated. Data representing the intra-queue manager times is also stored in memory unit 140.

Figure 6:
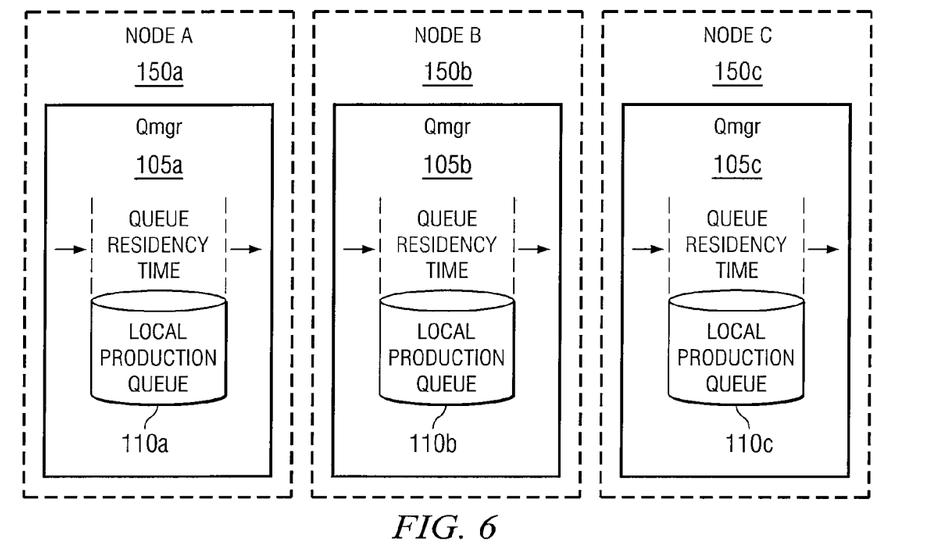
FIG. 6 illustrates an exemplary block diagram of the present disclosure for determining queue residency time.
Figure 7:
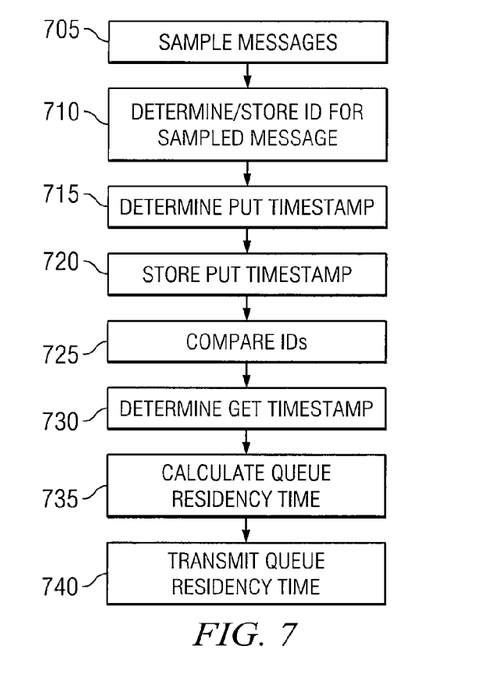
FIG. 7 illustrates an exemplary flow diagram of an embodiment for determining queue residency time.

In addition to determining the route time component, queue residency time is also needed for calculating the middleware response time, in 235. FIGS. 6 and 7 illustrate queue residency time and how it is determined in an exemplary embodiment of the present application. Queue residency time is defined as the time that an actual application message is stored in local production queue 110a, in local production queue 110b and in local production queue 110c, as shown in FIG. 6. The sum of the queue residency times is referred to as the total queue residency time. In an exemplary embodiment, measurement of queue residency times relies on an independent process in which respective agents sample actual application messages being put on respective local production queues, identifies the sampled message through a channel message exit and captures the point when that message is pulled from the local production queue. In an exemplary embodiment, messages are sampled at an adjustable rate. Based on the sample set of messages, queue residency time is calculated as described below with reference to FIG. 7.

Agents 115, 125, 130 determine queue residency time for local production queues 110a, 110b, 110c, respectively. The procedure for calculating queue residency time is described herein only with reference to agent 115 and local production queue 110a since the same procedure is followed at node B 150b and node C 150c in MOM network 100. As an application puts actual messages on the local production queue 110a, collection components such as a message exit and an API exit take at least one sample of the messages, in 705. Agent 115 determines and stores the identification ("ID") associated with the sampled message, in 710, and determines and stores the put timestamp, in 715 and 720, respectively. The put timestamp indicates the time that the sampled message was placed on local production queue 110a. In an exemplary embodiment, the ID is located in a field of the sampled message. When messages are retrieved from local production queue 110a by an application component, a comparison is performed between the IDs of the respective retrieved messages and the stored ID of the sampled message, in 725. If a positive match is made, another timestamp, referred to as the get timestamp, is determined, in 730. The get timestamp indicates the time the sampled message was retrieved from local production queue 110a. The queue residency time for local production queue 110a is then determined by agent 115, in 735. In an exemplary embodiment, the queue residency time equals the difference between the respective get timestamp and the respective put timestamp. The calculated queue residency time is transmitted to collection point 135, in 740. The queue residency times associated with each queue manager 105a, 105b, 105c are transmitted to collection point 135. Processing unit 145 adds the queue residency times to determine the total queue residency time and stores the individual queue residency times and the total queue residency time in memory unit 140. In a further exemplary embodiment, each agent calculates respective queue residency times by sampling multiple messages stored in the queue, determining corresponding put timestamps and get timestamps for the sampled messages, calculate multiple queue residency times and average the queue residency times over an interval.

In order to determine the total queue residency time, queue managers 105a, 105b, 105c in MOM network 100 do not have to be synchronized since the difference(s) between the put timestamp(s) for a sampled message(s) and the get timestamp(s) for the sampled message(s) are determined for a respective local production queue.

The estimated application middleware response time, consisting of the time for the sample message to travel through the middleware network, referred to as the route time, and the time sampled messages reside in local production queues 110a, 110b, 110c, is determined, in 240. The response time is then determined by combining the route time with the sum of queue residency times. Additionally, a network time can be determined by subtracting from the route time the total intra-queue manager time.

The exemplary embodiments of the present application for determining route time are described with reference to chained transmission queues that are kept independent from local production queues. By using transmission queues, the performance of actual application messages being transmitted over MOM network 100 is simulated. The exemplary embodiments, however, are equally applicable to using local production queues and/or actual application messages to determine route time and, thus, response time.

By transmitting data to collection point 135 and by storing this data in memory unit 140, additional performance information can be obtained, for instance, regarding queue statistics. Such queue statistics include average queue residency times, high and low queue residency times, number of get timestamps and the number of put timestamps. Further, thresholds can be set to generate alerts so that, for example, when a queue residency time is greater than a threshold, an alert is transmitted for the respective queue.

Additionally, one or more user interfaces can be developed so that the performance of MOM network 100 can be monitored. A user can monitor the response time, queues residency time(s) and route time, whether these times are within predetermined parameters or exceed a threshold, the number of messages in the sample message and the size of each message. For instance, a user interface can be developed and used to monitor the performance of one or more queues.

Figures 8A, 8B:
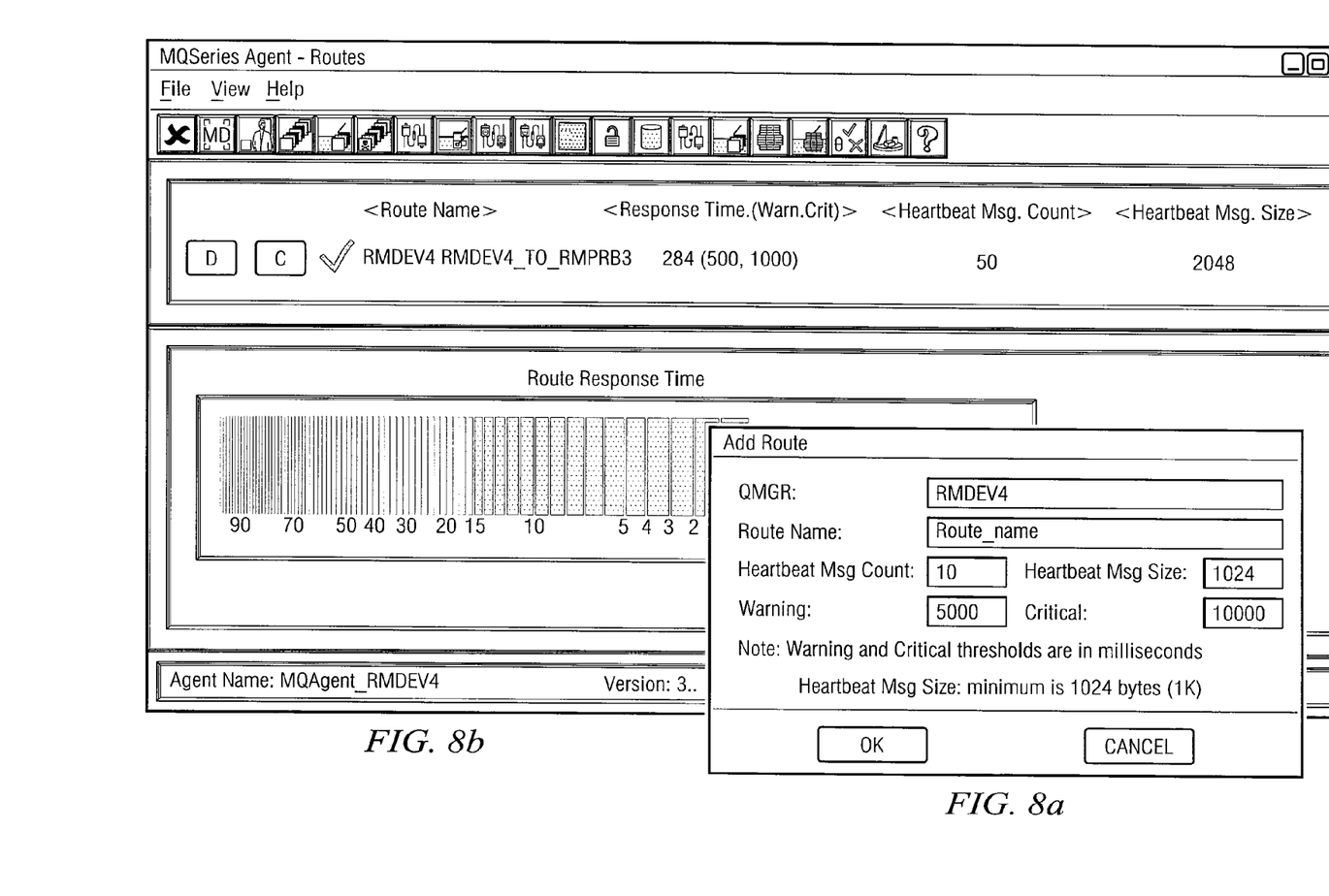
FIG. 8a illustrates an exemplary user interface of the present disclosure for developing a route.
FIG. 8b illustrates an exemplary user interface of the present disclosure for monitoring route time.
Figures 9A, 9B:
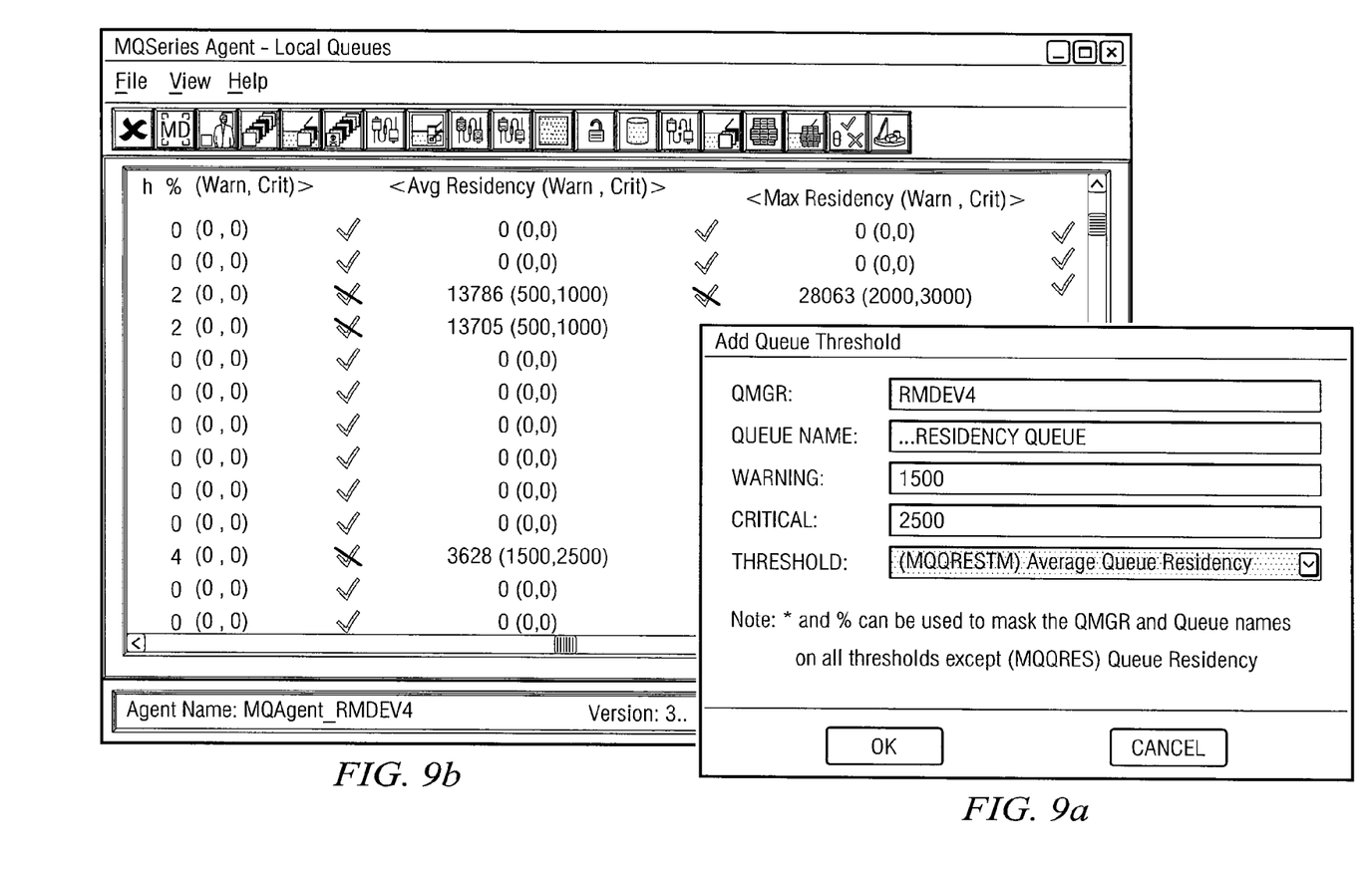
FIG. 9a illustrates an exemplary user interface of the present disclosure for adding a queue threshold.
FIG. 9b illustrates an exemplary user interface of the present disclosure for monitoring at least one queue.

FIG. 8b illustrates an exemplary user interface for monitoring at least one queue of the present application. Further, FIG. 7b illustrates an exemplary user interface for monitoring route time of the present application. The user interface can include list of all the queues, status of each queue and thresholds and current value for each metric. The desired parameters and thresholds can by input by the user via one or more additional user interfaces. FIG. 7a illustrates an exemplary user interface used by an agent for developing a route that a sample message will travel and FIG. 8a illustrates an exemplary user interface for adding a queue threshold for a particular queue.

In an exemplary embodiment, a route builder application is used for defining the path for the sample message. With the route builder application, each route is named and the individual queue managers are added. In the exemplary embodiments of the present application, the sample message is transmitted from originating queue manager 105a to destination queue manager 105c via intervening queue manager 105b and back to originating queue manager 105a along the exact same path, as shown in FIG. 3. Accordingly, originating queue manager 105a, intervening queue manager 105b and destination queue manager 105c do not have to be synchronized to determine route time. Alternatively, by changing the remote queue definition associated with destination queue manager 105c, the sample message can travel a different path back to originating queue manager 105a. Similarly, since the sample message is returning to originating queue manager 105a, the queue managers do not need to be synchronized. However, if the sample message is returned to a queue manager other than originating queue manager 105a, that queue manager and originating queue manager 105a need to be synchronized to determine the route time.

In a further alternative embodiment, a uni-directional route time can be determined, that is the time for the sample message to travel from originating queue manager 105a to destination queue manager 105c. Originating queue manager 105a and destination queue manager 105c would need to be synchronized to accurately estimate the route time. Data is collected at collection point 135 from the respective queue managers and route time is determined by processing unit 145.

The embodiments described above are illustrative examples of the present application and it should not be construed that the present application is limited to these particular embodiments. Various changes and modifications may be effected by one skilled in the art without departing from the spirit or scope of the invention as defined in the appended claims.

What is claimed is:

1. A method for monitoring middleware performance, the method comprising:
    using one or more remote queue definitions to create a predetermined network route;
    determining a route time for a message transmitted along the predetermined network route;
    determining at least one queue residency time, the at least one queue residency time reflecting an amount of time at least one other message is stored in at least one respective queue located along the predetermined network route; and
    calculating a middleware response time according to the route time and the at least one queue residency time.

2. The method as set forth in claim 1, wherein
    determining the route time includes determining an amount of time for the message to travel from a source node along the predetermined network route to a destination node and then back to the source node.

3. The method as set forth in claim 2, wherein
    determining the route time includes
    determining an origination timestamp indicating when the message was sent from the source node,
    storing the origination timestamp in a field of the message,
    determining an end timestamp indicating when the source node receives the message from the destination node,
    storing the end timestamp in another field of the message, and
    calculating the route time by determining the difference between the origination timestamp and the end timestamp.

4. A method for monitoring middleware performance, the method comprising:
    determining a route time for a message transmitted along a predetermined network route;
    determining at least one queue residency time, the at least one queue residency time reflecting an amount of time at least one other message is stored in at least one respective queue located along the predetermined network route; and
    calculating a middleware response time according to the route time and the at least one queue residency time wherein determining the at least one queue residency time includes;
    sampling a plurality of application messages,
    determining an identification for the sampled message, the identification being stored in a field of the sampled message,
    storing the identification of the sampled message,
    determining a put timestamp for the sampled message, the put timestamp indicating when the sampled message was placed on a local production queue,
    comparing identifications associated with messages retrieved from the local production queue with the identification of the sampled message,
    determining a get timestamp for the sampled message, if a match is determined, the get timestamp indicating when the sampled message was retrieved from the local production queue, and
    calculating a queue residency time by determining the difference between the put timestamp and the get timestamp.

5. The method as set forth in claim 1, wherein calculating the middleware response time includes
    adding the route time and the at least one queue residency time.

6. The method as set forth in claim 1, wherein the message is a user-defined sample message replicating an actual application message.

7. The method as set forth in claim 6, wherein the user-defined sample message is a plurality of messages batched together, the plurality of messages having the same or varying sizes.

8. A method for monitoring middleware performance, the method comprising:
    using one or more remote queue definitions to create a predetermined network route;
    determining a route time for a message transmitted along the predetermined network route, the route time reflecting an amount of time for the sample message to travel from an origination queue manager to a destination queue manager and then back along the same route to the origination queue manager;
    determining at least one queue residency time for at least one local production queue, the at least one local production queue being associated with the origination queue manager and/or the destination queue manager and the at least one queue residency time reflecting the amount of time an actual application message is stored in the at least one local production queue; and calculating a middleware response time by adding the route time to the at least one queue residency time.

9. A system for monitoring middleware performance, the system comprising:

a computer system adapted to generate a sample message and an application message; and a computer memory electrically connected to the computer system encoded with instructions for performing the following:

using one or more remote queue definitions to create a predetermined network route:

determining a route time for a message transmitted along a the predetermined network route;

determining at least one queue residency time, the at least one queue residency time reflecting an amount of time the application message is stored in at least one respective queue located along the predetermined network route; and calculating a middleware response time according to the route time and the at least one queue residency time.

10. The method of claim 1, wherein using one or more remote queue definitions to create a predetermined network route comprises using the one or more remote queue definitions to identify one or more nodes along the predetermined network route.

11. The method of claim 10, wherein:

each node along the predetermined network route is associated with at least one of the one or more remote queue definitions; and each of the one or more remote queue definitions identifies a next node along the predetermined network route.

12. The method of claim 1, further comprising:

subtracting from the route time, one or more intra-queue manager times associated with the at least one respective queue located along the predetermined network route.

13. The method of claim 1, wherein the predetermined network route comprises one or more user-defined nodes.

14. The method of claim 1, wherein the predetermined network route comprises a predetermined network route between a first node and a second node.

15. The method of claim 3, wherein:

the message comprises a sample message;

the source node comprises a first transmission queue;

the destination node comprises a second transmission queue;

determining at least one queue residency time comprises:

sampling a first plurality of application messages stored on a first local production queue;

sampling a second plurality of application messages stored on a second local production queue; and wherein:

the first transmission queue and the second transmission queue are respectively associated with the first local production queue and the second local production queue.

16. The method of claim 1, further comprising:

creating an alert respectively associated with the at least one respective queue, the alert defined by one or more queue statistics of the at least one respective queue; and triggering the alert if the one or more queue statistics violate a user-defined condition.

17. The system of claim 9, wherein using one or more remote queue definitions to create a predetermined network route comprises using the one or more remote queue definitions to identify one or more nodes along the predetermined network route.

18. The system of claim 17, wherein:

each node along the predetermined network route is associated with at least one of the one or more remote queue definitions; and each of the one or more remote queue definitions identifies a next node along the predetermined network route.

19. The system of claim 9, wherein determining the route time includes determining an amount of time for the message to travel from a source node along the predetermined network route to a destination node and then back to the source node.

20. The system of claim 9, wherein the predetermined network route comprises one or more user-defined nodes.

21. The system of claim 9, wherein the predetermined network route comprises a predetermined network route between a first node and a second node; and further comprising a user interface operable to develop the predetermined network route.

22. The system of claim 9, wherein calculating the middleware response time includes adding the route time and the at least one queue residency time.

23. The system of claim 9, wherein determining the at least one queue residency time includes:

sampling a plurality of application messages, determining an identification for the sampled message, the identification being stored in a field of the sampled message, storing the identification of the sampled message, determining a put timestamp for the sampled message, the put timestamp indicating when the sampled message was placed on a local production queue, comparing identifications associated with messages retrieved from the local production queue with the identification of the sampled message, determining a get timestamp for the sampled message, if a match is determined, the get timestamp indicating when the sampled message was retrieved from the local production queue, and calculating a queue residency time by determining the difference between the put timestamp and the get timestamp.

* * * * *